United States Patent Office 3,221,032
Patented Nov. 30, 1965

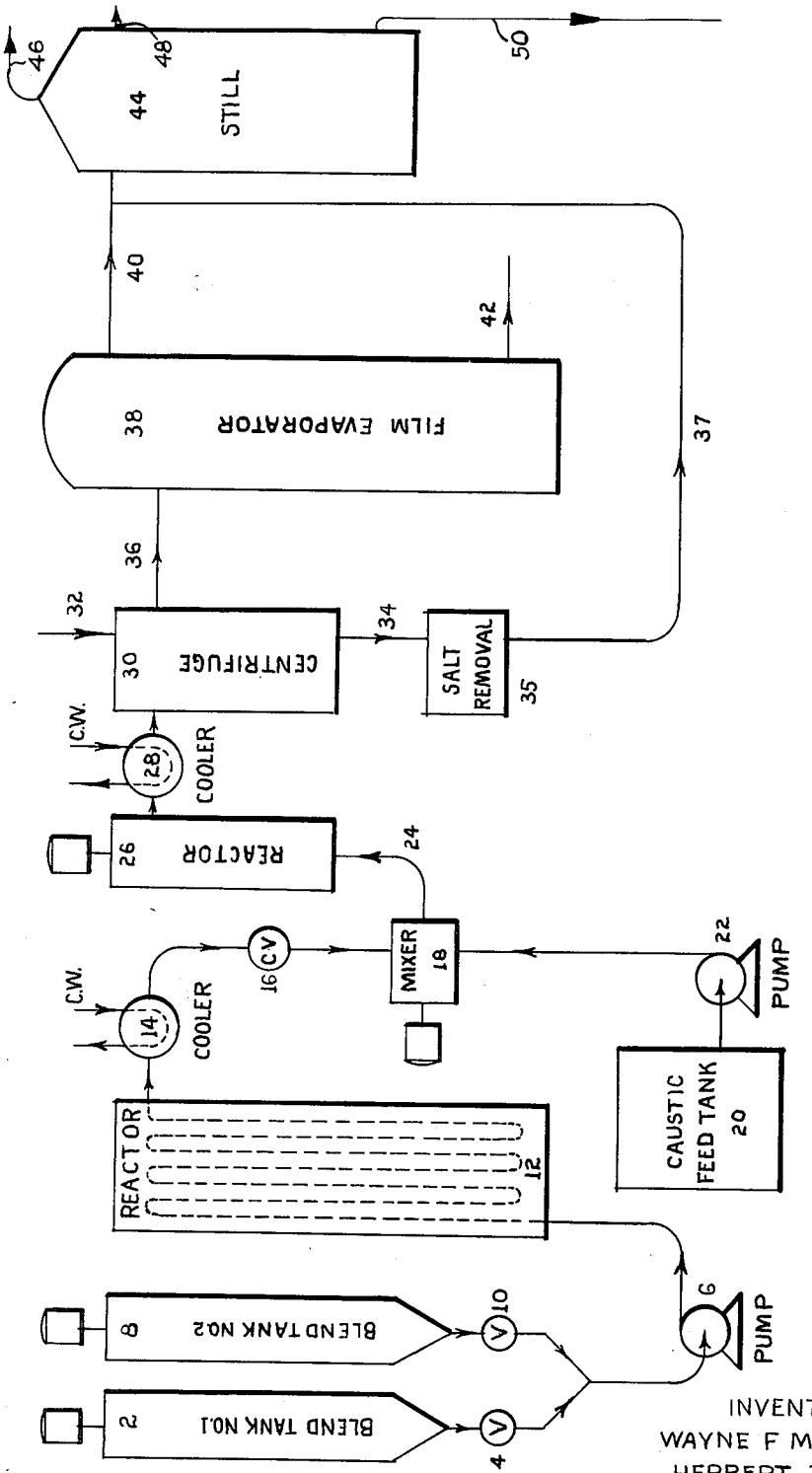

3,221,032
CONTINUOUS PROCESS FOR THE PREPARATION OF GLYCIDYL POLYETHERS
Herbert P. Price and Wayne F. McWhorter, Louisville, Ky., assignors, by mesne assignments, to Devoe & Raynolds Company, Inc., New York, N.Y., a corporation of Delaware
Filed Apr. 18, 1960, Ser. No. 22,771
7 Claims. (Cl. 260—348.6)

This invention pertains to the provision of a continuous process for the production of glycidyl polyethers of polyhydric phenols. More particularly, glycidyl polyethers of polyhydric phenols having low molecular weights, say below 600, can be prepared continuously and in high yields in accordance with this invention.

In the production of glycidyl polyethers of polyhydric phenols it is generally the practice to react the phenol and the epihalohydrin in the presence of caustic alkali. It is now generally accepted that in such a process the first reaction taking place is that of the caustic alkali and the phenol to form the phenolate and water. The phenolate then reacts with epihalohydrin to form the halohydrin ether. Due to the presence of caustic alkali, the halohydrin ether is in part, converted to the glycidyl polyether by dehydrohalogenation.

Methods of preparing glycidyl polyethers in which caustic alkali is used initially do not lend themselves completely to continuous operation because of the insolubility of the phenolate. It is generally necessary to use a large quantity of water in a continuous process of this type to keep the phenolate in solution. In addition, since the glycidyl polyether which is formed in the same reactor is insoluble in water, it is also necessary to mix the water with a solvent for the polyether, for example, a ketone such as acetone to maintain single phase operation.

In accordance with the practice of this invention, solubility problems attributable to phenolate formation are eliminated by catalytically condensing the epihalohydrin and the polyhydric phenol rather than using a caustic alkali. This results in the formation of the halohydrin ether since very little dehydrohalogenation takes place. In other words, the halohydrin ether is preformed. In addition, epihalohydrin is employed as the reaction medium in the absence of water or other solvent, or in the presence of only a small amount of such solvent, for instance less than 2 percent.

Another advantage of this invention is that continuous processes carried out heretofore, have required excessively long residence times because of low temperature condensations. It has been necessary to carry out the reaction of the phenol and the epihalohydrin at low temperatures to avoid the formation of excessive amounts of glycerol dihalohydrin. In the carrying out of this invention, as will be seen, glycerol dihalohydrin does not interfere with the process.

A particularly important aspect of this invention involves the treatment of the epihalohydrin solution of preformed halohydrin ether and side reaction products. The catalytic condensation reaction of a polyhydric phenol with an epihalohydrin results in a solution, in epihalohydrin, of the polyhalohydrin ether and minor amounts of side reaction products such as glycerol dihalohydrin. It is possible at this point in the process to distill the halohydrin ether solution to remove the glycerol dihalohydrin as well as excess epihalohydrin prior to dehydrohalogenation. It has been found, however, that it is not necessary to remove glycerol dihalohydrin at this point. By the practice of this invention, the entire epihalohydrin solution containing not only the preformed polyhalohydrin ether but also the glycerol dihalohydrin (and any unreacted phenol) is subjected to dehydrohalogenation conditions. This dehydrohalogenation results in the conversion of the halohydrin ether to the glycidyl ether and the concomitant conversion of glycerol dihalohydrin to epihalohydrin. This improvement has the advantage of not only eliminating the distillation and recovery step, but of taking care of the glycerol dihalohydrin formed during the reaction which heretofore has been one of the troublesome features of a continuous process.

In previous processes where glycerol dihalohydrin is removed prior to dehydrohalogenation, the glycerol dihalohydrin is either lost or must be converted to epihalohydrin in a separate process. By this invention there is an in situ conversion of glycerol dihalohydrin back to epihalohydrin. This conversion is accomplished by adding sufficient caustic alkali during the dehydrohalogenation of the preformed polyhalohydrin ether to react with all of the epihalohydrin consumed or converted during the epihalohydrin phenol condensation reaction. The amount of caustic alkali can best be based on the number of phenolic hydroxyls in the starting material, and one mol of the inorganic base is used per phenolic hydroxyl in the feed. The number of halohydrin groups to be dehydrohalogenated is equal to the number of phenolic hydroxyl groups since one mol of glycerol dihalohydrin forms when each glycidyl ether group is formed. The total number of halohydrin groups to be dehydrohalogenated is thus the same whether halohydrin ether groups have been formed, or glycidyl ether groups and glycerol dihalohydrin.

Referring more specifically to the process of the invention, the condensation reaction of the epihalohydrin and the polyhydric phenol is carried out in a continuous manner with an epihalohydrin, such as epichlorhydrin, epibromohydrin or epiiodohydrin, a polyhydric phenol such as bisphenol or resorcinol, and the catalyst being continuously introduced into a reaction zone. The condensation reaction is carried out at a temperature of 100° C. to 180° C. and a period of 30 minutes to three hours under 50 to 100 pounds gage pressure, although atmospheric can be employed if desired. The preferred temperature is 125° C. to 150° C.

Condensation catalysts include tertiary amines, and their amine salts, quaternary ammonium compounds and alkali metal salts. For example, trimethyl amine, triethanolamine, tetramethyl ammonium hydroxide, benzyl trimethyl ammonium chloride, benzyl trimethyl ammonium acetate, methyl triethyl ammonium chloride, benzyl dimethylamine and alkali metal salts. Particularly effective are alkali metal halides, for instance, lithium bromide, lithium chloride, potassium bromide and the like. While bases are generally employed in an amount of one mol per phenolic hydroxyl as described, salts are usually used in amounts of .05 to 5 percent.

Among the phenols which can be reacted with the epichlorhydrin or other epihalohydrin are mononuclear polyhydric phenols such as resorcinol, hydroquinone, catechol, phloroglucinol, etc., or polynuclear phenols, such as bisphenol, (p,p'-dihydroxydiphenyl dimethyl methane), p,p'-dihydroxyphenone, p,p' - dihydroxydiphenyl, p,p' - dihydroxydibenzyl, o,p,o',p'-tetrahydroxydiphenyl dimethyl methane, hematoxylin, polyhydric anthracenes, polyhydric napthalenes, etc. Bisphenol is particularly advantageous for use in making these glycidyl polyethers.

To bring about the dehydrohalogenation, the preformed polyhalohydrin ether in the epihalohydrin solution, along with its by-products, is mixed with a caustic alkali or other well known dehydrohalogenating agent under known conditions such as temperatures of 50° C. to 125° C. and reaction periods of 2 minutes to 2 hours and dehydrohalogenated to form the glycidyl polyether and to convert glycerol dihalohydrin to epihalohydrin. Well known dehydrohalogenating agents are such basic inorganic compounds as NaOH, KOH, Ca(OH)₂, Ba(OH)₂ and such salts as sodium zincate, sodium aluminate, etc. The product is then purified in accordance with known methods of purification. For example, salt formed during the reaction can be removed by water wash or by filtration and then the product can be heated to remove water and, if desired, the epihalohydrin solvent.

The method of purifying resin, as well as the process itself, can be best understood by references to the drawing. In the accompanying diagrammatic drawing, reference to some equipment such as pumps, gages and other equipment which obviously would be necessary to actually operate the process have been intentionally omitted. Only sufficient equipment has been shown to illustrate the process of the invention, and it is intended that no undue limitation be read into this invention by reference to the drawing and the discussion thereof.

Referring to the drawing in blend tank 2, a solution made using a ratio of 10 mols of epichlorhydrin to 1 mol of bisphenol and 1 percent of benzyl trimethyl ammonium chloride, based on bisphenol, are agitated. The monomer-catalyst solution of blend tank 2, by means of valve 4 and metering pump 6 is fed into reactor 12. To afford continuous flow, a monomer-catalyst solution is maintained in blend tank 8 to be put on stream when the feed in blend tank 2 is exhausted. The monomer-catalyst solution in reactor 12 is heated at 150° C. under 75 to 80 pounds gage pressure to bring about the reaction of bisphenol and epihalohydrin. The residence time of the solution of reactants in reactor 12 is governed by control valve 16 and is maintained at 42 minutes to form the halohydrin ether of bisphenol and some glycerol dichlorohydrin in solution in epichlorhydrin. The preformed halohydrin ether solution passes from reactor 12 through cooler 14 and control valve 16 into mixer 18 at a flow rate of 350 ml. per minute. At the same time a 40 percent sodium hydroxide dispersion in xylene is withdrawn from caustic tank 20. By means of pump 22, an amount of caustic equivalent to phenolic hydroxyls in the feed, 90 ml. per minute, is introduced into mixer 18. The caustic and preformed halohydrin ether are mixed in mixer 18 and the halohydrin ether-epichlorhydrin caustic mix is drawn through line 24 into a second reactor 26 fitted with an agitator and means for heating its contents. The caustic-preformed halohydrin ether mixture is agitated in reactor 26 and heated at 96° C. to 105° C. for 10 minutes to bring about the dehydrochlorination of chlorohydrin groups of both chlorohydrin ether and glycerol dichlorohydrin. The dehydrochlorinated product from reactor 26 is cooled in cooler 28 and passed to centrifuge 30 adapted for the removal of sodium chloride formed during dehydrochlorination. The salt is washed with epichlorhydrin introduced by means of line 32 and the washed salt cake is removed through line 34 to heater 35 to recover epichlorhydrin. The epichlorhydrin is sent back to the system through line 37. The product-epichlorhydrin solution from centrifuge 30 is conveyed to a film evaporator 38 through line 36. In film evaporator 38 the water of reaction, the caustic dispersion medium and epichlorhydrin are evaporated from the product at 150° C. under vacuum and withdrawn through line 40 into still 44. The product remaining in film evaporator 38 is drawn off through line 42. In still 44 the water, caustic dispersion medium (xylene) and epichlorhydrin are separated by distillation. The water is drawn off through line 46, the caustic dispersion medium is removed by means of line 48, and the epichlorhydrin is withdrawn through line 50 for reuse.

A number of glycidyl polyethers are prepared in accordance with the process described in connection with the drawing. The conditions together with the results of these preparations are shown in the table.

TABLE

| Reaction conditions during condensation | 282p203-6 | 282p248 | 282p241 | 282p242 | 282p245. |
|---|---|---|---|---|---|
| Reaction temperature, °C | 150 | 150 | 150 | 150 | 150. |
| Molratio epichlorhydrin: bisphenol | 10:1 | 10:1 | 10:1 | 10:1 | 10:1. |
| Molratio epichlorhydrin: resorcinol | | 10:1 | | | |
| Residence time | 42 min | 46 min | 42 min | 42 min | 42 min. |
| Catalyst (1 wt. percent based on phenol) | LiBr | α-methylbenzyl dimethyl amine | BTMACI* | BTMACI* | BTMACI*. |
| Dehydrochlorination: | | | | | |
| Amount of NaOH (40 percent dispersion in xylene) | 2 mols: 1 mol phenol. | 2 mols: 1 mol phenol. | 2 mols: 1 mol phenol. | 2 mols: 1 mol phenol. | 2 mols: 1 mol phenol. |
| Reaction temperature, °C | 95 to 100 | 100 to 105 | 100 to 105 | 100 to 105 | 100 to 105. |
| Residence time | 12 min | 5 min | 1 to 2 min | 6 min | 5 min. |
| Properties of glycidyl polyether: | | | | | |
| Weight per epoxide group | 191 | 128 | 188 | 188 | 193. |
| Total chlorine content, percent by weight | 2.4 | 1.5 | .5 | .7 | 1.1. |
| Viscosity (Gardner-Holdt) | Not run | Q-R | Not run | Z⁴ | Z₄. |

*BTMACI- benzyltrimethyl ammonium chloride.

It has been pointed out that the use of water as in prior art processes is disadvantageous. This is true whether water is used in order to compensate for the phenolate formed or whether water is used as a solvent for the caustic employed as a dehydrohalogenating agent. Any water employed lessens somewhat the recovery of epichlorhydrin inasmuch as epichlorhydrin is soluble in water to the extent of about 1 and ½ percent. When large quantities of water are present, more epichlorhydrin is lost due to its solubility in water. In addition, water and epichlorhydrin in the presence of caustic will react to form glycerine, glycerol, monochlorohydrin and other chlorohydrin compounds. Moreover, the separation of epichlorhydrin from water is quite troublesome.

In addition to loss of epichlorhydrin, it has been found that when the amount of water is kept to a minimum, lower molecular weight resins result. That is epoxides having lower weights per epoxide can be formed than those resulting when water is present in over 4 percent. It is noted, for example, that the weights per epoxide group of the epoxide resins using 40 percent caustic dispersion in xylene as shown in the foregoing table, have weights per epoxide of less than 192. However, when 35 percent aqueous caustic is employed under the same conditions using bisphenol, resulting weights per epoxide range from 215 to 260. According to a preferred aspect of this invention, therefore, anhydrous dehydrohalogenating agents are employed, a particularly desirable system being one in which the hydroxide is dispersed in a hydrocarbon such as xylene, benzene, heptane, pentane, the naphthas and the like. It should be pointed out, however, that the inorganic hydroxide can be employed in the dry state, for instance, flake sodium hydroxide. This can best be illustrated by the following example.

*Example A*

Epichlorhydrin and bisphenol in a 10 to 1 mol ratio with 3 cc. of benzyltrimethylammonium chloride (60 percent aqueous solution) per mol of bisphenol are reacted as described in conjunction with the drawing. The monomer-catalyst solution continuously introduced into the reactor and heated at 150° C. under 50 to 55 pounds gage pressure to bring about the reaction of bisphenol and epichlorhydrin. The residence time of the solution of reactants is maintained at 42 minutes to form the chlorohydrin ether of bisphenol and some glycerol dichlorohydrin in solution in epichlorhydrin. The chlorohydrin ether solution is continuously withdrawn, mixed with 2 mols of flake sodium hydroxide per mol of bisphenol (plus 10 percent excess) and then heated to 105° C. in the dehydrohalogenation zone to bring about the dehydrochlorination of chlorohydrin groups of both chlorohydrin ether and glycerol dichlorohydrin. The salt cake is then washed and removed as described in connection with the drawing, and the epichlorhydrin is evaporated from the product. The resulting glycidyl ether of bisphenol has a weight per epoxide of 190 and active chlorine content of 1.1 percent.

One of the features of this invention is the process of preforming the polyhalohydrin ether in one of the continuous processes and subsequently dehydrohalogenating the preformed halohydrin ether in a separate stage of the process for better control of the process and to eliminate the necessity for using water. For the purpose of comparison with the compositions shown in the foregoing table, the process was carried out without preforming the halohydrin ether. The resulting epoxide resin has a much higher weight per epoxide and a higher chlorine content. This can best be illustrated by the following example.

*Example B*

Flake sodium hydroxide (anhydrous) epichlorhydrin and bisphenol, in a ratio of 10 mols of epichlorhydrin to 1 mol of bisphenol, and 2 mols of the sodium hydroxide (plus a 10 percent excess), are introduced into a single reactor.

The condensation is accomplished in a continuous manner under reaction conditions set forth in Example A. But in the modification dehydrochlorination also takes place concomitantly in the reaction zone due to the amount of caustic employed. This epoxide resin when purified as in Example A, has a weight per epoxide of 915 and an active chlorine content of 7.8 percent. An attempt was made to prepare another epoxide resin using a 40 percent dispersion of sodium hydroxide in xylene instead of the flake sodium hydroxide. However, with the use of the caustic dispersion in a procedure as given above, the formation of the sodium salt of bisphenol caused the lines to plug.

The foregoing discussion and examples illustrate the remarkable improvement attained by the practice of this invention in preforming polyhalohydrin ethers and maintaining water content at a low level. The foregoing illustrates the marked improvement in weights per epoxide achieved by a continuous process through control of these two conditions. In addition, it has been shown that the process is easier to carry out continuously by following the teachings of this invention.

It will be obvious to those skilled in the art that changes can be made in the equipment in which this continuous process is carried out. Thus, instead of a coil reactor the two reactions can be carried out in autoclaves or other vessels equipped with stirring means. Other variations and modifications along these lines will also occur to one skilled in the art. Such embodiments are deemed to be within the scope of this invention.

What is claimed is:

1. A continuous process for preparing glycidyl polyethers of polyhydric phenols, said polyethers having a molecular weight below about 600, said process comprising
    (A) continuously introducing reactants consisting essentially of
        (1) a polyhydric phenol with
        (2) at least 2.5 mols of epihalohydrin per hydroxyl equivalent of polyhydric phenol and said epihalohydrin being sufficient to function as a reaction medium, and
        (3) 0 to about 2 weight percent water, based upon the weight of epihalohydrin into a reaction zone,
    (B) bringing the epihalohydrin and polyhydric phenol into intimate contact with each other and with a catalytic amount of a condensation catalyst in the reaction zone and at a temperature above about 125° C. to thereby preform a polyhalohydrin ether of the polyhydric phenol along with side reaction products, including glycerol dihalohydrin, in solution in the epihalohydrin, said condensation catalyst being selected from the group consisting of
        (1) quaternary ammonium salts,
        (2) quaternary ammonium hydroxides,
        (3) tertiary amines containing no active amine hydrogens,
        (4) tertiary amine salts containing no active amine hydrogens, and
        (5) alkali metal halides,
    (C) continuously withdrawing the epihalohydrin solution containing the preformed polyhalohydric ether and glycerol dihalohydrin to a dehydrohalogenation zone, and
    (D) with the epihalohydrin still present as well as glycerol dihalohydrin, heating both the polyhalohydrin ether and the glycerol dihalohydrin to a temperature of at least 50° C. and thereby dehydrohalogenating with an alkaline dehydrohalogenating agent selected from the group consisting of
        (1) the alkali metal hydroxides,
        (2) the alkaline earth metal hydroxides,
        (3) the zincates of 1 and 2 above and
        (4) the aluminates of 1 and 2 above
to form a glycidyl polyether of the polyhydric phenol from the polyhalohydrin ether, and an epihalohydrin from the glycerol dihalohydrin.

2. The process of claim 1 wherein the polyhydric phenol is p,p'-dihydroxy-diphenyl dimethyl methane, the epihalohydrin is epichlorohydrin, and the condensation catalyst is a quaternary ammonium salt.

3. The process of claim 2 wherein the only water present is that water formed during dehydrohalogenation.

4. The process of claim 2 wherein the condensation catalyst is benzyl trimethyl ammonium chloride, and wherein the dehydrohalogenation reaction includes reacting the chlorohydrin groups with sufficient alkaline dehydrohalogenating agent to react with the chlorine atoms of the chlorohydrin groups.

5. The process of claim 4 wherein the alkaline dehydrohalogenation agent is anhydrous.

6. The process of claim 4 wherein the alkaline dehydrohalogenating agent is sodium hydroxide dispersed in a hydrocarbon solvent having a boiling point above 35° C.

7. The process of claim 4 wherein the condensation reaction is carried out at a temperature of 125° C. to 150° C.

References Cited by the Examiner

UNITED STATES PATENTS

| | | | |
|---|---|---|---|
| 2,801,227 | 7/1957 | Goppel | 260—47 XR |
| 2,840,540 | 6/1958 | Pezzaglia | 260—47 |
| 2,864,805 | 11/1958 | Cooke | 260—47 |
| 2,943,096 | 6/1950 | Reinking | 260—47 XR |
| 2,986,551 | 5/1961 | Griffin | 260—47 |
| 2,986,552 | 5/1961 | Landua et al. | 260—47 |
| 3,035,018 | 5/1962 | Price et al. | 260—47 |

WILLIAM H. SHORT, *Primary Examiner.*

PHILIP E. MANGAN, HAROLD N. BURSTEIN, MILTON STERMAN, *Examiners.*